3,646,167
BLOCK COPOLYMERS CONTAINING A
POLYETHYLENE SULFIDE BLOCK
George A. Pope, Clarkson, Ontario, Canada, and Peter
T. Hale, Erdington, Birmingham, and David A. Bird,
Walmley, Sutton, Coldfield, England, assignors to The
Dunlop Company Limited, London, England
No Drawing. Filed Feb. 28, 1969, Ser. No. 803,407
Claims priority, application Great Britain, Mar. 5, 1968,
10,539/68
Int. Cl. C08f 15/04
U.S. Cl. 260—879                                    11 Claims

ABSTRACT OF THE DISCLOSURE

A block copolymer having a configuration A, B, C, in which A is a block of a relatively rigid polymer having an average molecular weight of from 5,000 to 50,000. B is an elastomeric block having an average molecular weight of from 20,000 to 400,000 and C is a crystalline block having a molecular weight of from 300 to 20,000.

---

This invention relates to block copolymers and, more particularly, concerns block terpolymers.

According to the present invention a block copolymer has a configuration A–B–C in which A represents a block of a relatively rigid polymer, B represents an elastomeric block and C represents a crystalline block.

Preferably, the block A has an average molecular weight in the range particularly 5,000 to 50,000, more particularly, 5,000 to 30,000 and may constitute 2 to 60 percent, preferably 4 to 60 percent, more preferably 10 to 30 percent by weight of the block copolymer. Advantageously the A block has a second-order transition temperature higher than 50° C., Examples of monomers suitable for producing the block A are styrene and substituted derivatives thereof such as 2,5-dimethyl styrene, 4-vinyl toluene or alpha-methyl styrene and vinyl naphthalene and substituted derivatives thereof.

The block B preferably has an average molecular weight in the range 20,000 to 400,000, particularly 20,000 to 100,000 and may constitute 10 to 95 percent, preferably 60 to 90 percent by weight of the block copolymer. The second-order transition temperature of the block B is, advantageously, below 15° C. The block B may be homopolymeric derived from dienes such as isoprene, i.e. 1,4-isoprene or 3,4-isoprene, butadiene and their substituted derivatives or copolymeric derived from dienes and a copolymerisable monomer, e.g. isoprene/ styrene or butadiene/styrene.

The block C preferably has an average molecular weight in the range 300 to 20,000, particularly 1,000 to 10,000 and may constitute 0.1 to 30 percent, preferably 1 to 30 percent, more preferably 1 to 10 percent by weight of the block copolymer. Advantageously, the melting point of the block C is greater than 50° C. and, more preferably, above 100° C. Suitable monomers from which the block C may be derived are ethylene sulphide, formaldehyde, ethylene oxide and N-phenyl maleimides.

According to a further aspect of the present invention, a method of producing a block copolymer having a configuration A–B–C comprises polymerising a monomer in an inert solvent to produce block A, polymerising the polymeric block A with a monomer capable of producing block B, and polymerising the block A–B with a monomer capable of producing block C.

The polymerisation may be carried out in a hydrocarbon solvent such as benzene, hexane, cyclohexane or toluene, and the same solvent may be used for all three stages of the polymerisation. In some cases it is preferred to change or modify the solvent for the third stage in order to obtain phase separation of the polymer, e.g. saturated ethers and amines such as tetrahydrofuran, methoxy-ethane, tetramethyl ethylene diamine may be used either in addition to the original solvent or as a substantial replacement for this stage. The amount of solvent used to modify the solvent mixture is typically up to 10 percent of the original amount of solvent. An alkyl-lithium compound, e.g. n-butyl lithium or sec-butyl lithium, may be utilised as a polymerisation catalyst. The preparation is preferably carried out in an inert atmosphere, for example under argon.

The polymers of the present invention behave as thermoplastic elastomeric materials and have a number of important features. They are soft and flexible and styrene-isoprene-ethylene sulphide block copolymers exhibited stress/strain curves having 100 percent and 200 percent moduli which were similar to those of a 30 percent oil-extended styrene butadiene-styrene block copolymer. The low modulus is believed to be due to the fact that the crystalline block C is present only in relatively small amounts. As a corollary of this, the block C is of significantly lower molecular weight than would be necessary with a non-crystalline block.

The polymers also have desirable melt-flow characteristics and improved thermal properties, the stability of styrene-butadiene-ethylene sulphide block copolymer being significantly better than oil-extended styrene-butadiene-styrene block copolymer. They are, of course, particularly useful for producing moulded elastomer articles.

The invention is illustrated by the following examples:

EXAMPLE I

This example illustrates the preparation of an A–B–C terpolymer, whose A block is polystyrene, the B block is a "mixed structure" polyisoprene and the C block is polyethylene sulphide using high vacuum techniques and by substantially changing the solvent for the growing of the C block.

The monomers were rigorously dried and degassed.

The required volumes of benzene and styrene were distilled under vacuum into a polymerisation reactor and a butyl lithium anisole catalyst complex (1:0.7 mole ratio; 3.29 mmoles) added under dry argon. The reaction mixture was heated to 40° C. and the polymerisation was complete after 3 hours, then the required volume of isoprene was added at a rate such as to keep the polymerisation controllable.

When the isoprene polymerisation was completed a major portion of the solvent was removed by distillation and replaced by the required amount of tetrahydrofuran, distilled out of a solution of its sodium naphthalene complex. The reactor and contents were stirred until the solid polymer had dissolved. (During this stage the colour of the polyisopropylene anion intensified from a very pale yellow in benzene to a strong yellow colour in tetrahydrofuran). The required volume of ethylene sulphide was added and after 20–30 minutes the contents set to a lightly gelled mass. After 3–4 hours the polymerisation mixture was added to acidified alcohol and a theoretical yield of polymer was obtained.

Experimental details for the preparation of styrene-isoprene-ethylene sulphide block copolymers are given in Table IA and the characteristics and properties in Table IB:

in Table IIA and the characteristics and properties in Table IIB:

TABLE IIA

| Sample | Solvent (ml.) | Anisole (ml.) | n-Butyl solution (ml.) | Lithium mmoles active initiator | Styrene (g.) | Isoprene (g.) | Ethylene sulphide (g.) | Tetrahydrofuran (ml.) | Yield |
|---|---|---|---|---|---|---|---|---|---|
| F | Hexane/benzene (250) | 0.10 | 0.45 | 1.055 | 12 | 40.8 | 2.5 | 47 | 53.9 |
| G | do | 0.10 | 0.45 | 1.055 | 12 | 40.8 | 1.8 | 21 | 51.8 |

TABLE IA

| Sample | Solvent (ml.) | Anisole (ml.) | n-Butyl solution (ml.) | Lithium, mmoles active initiator | Styrene (g.) | Isoprene (g.) | Ethylene sulphide (g) | Tetrahydrofuran (ml.) | Yield (g.) |
|---|---|---|---|---|---|---|---|---|---|
| A | Benzene (180) | 0.25 | 1.75 | 3.29 | 24 | 87 | 3.6 | 100 ml. benzene replaced by 130 ml. THF. | 114.6 |
| B | Benzene (200) | 0.13 | 0.90 | 1.692 | 24 | 78.2 | 2.0 | 150 ml. benzene replaced by 200 ml. THF. | 104.2 |
| C | Hexane/benzene (300) | 0.065 | 0.60 | 1.128 | 24 | 78.2 | 2.5 | 220 ml. solvent removed, replaced by same vol. THF. | 104.5 |
| D | Benzene (250) | 0.25 | 1.75 | 3.29 | 24 | 87.7 | 7.1 | 150 ml. solvent removed, replaced by same vol. THF. | 118.8 |

TABLE IB

| Sample | Styrene (wt. percent) | Isoprene (wt. percent) | Ethylene sulphide (wt. percent) | Calc. segmented mol. wt. ($M_n$) | Total calc'd $M_a$ |
|---|---|---|---|---|---|
| A | 20.9 | 76.2 | 2.9 | S-7,300<br>Is-26,400<br>ES-1,100 | 34,800 |
| B | 23.25 | 75.2 | 1.55 | S-14,200<br>Is-46,400<br>ES-1,200 | 61,800 |
| C | 22.4 | 75.7 | 1.9 | S-21,200<br>Is-69,000<br>ES-2,200 | 92,400 |
| D | 19.6 | 74.5 | 5.9 | S-2,300<br>Is-26,700<br>ES-2,150 | 36,150 |

| | Mol. wt. (by GPC) found | | | Tensile strength (kg./cm.$^{-2}$) | Percent elong. at break |
|---|---|---|---|---|---|
| Sample | $M_n$ | $M_n$ | $M_w/M_n$ | | |
| A | 57,160 | 31,930 | 1.80 | 22 | 380 |
| B | 114,200 | 67,450 | 1.69 | 75.5 | 1,000 |
| C | 175,700 | 118,550 | 1.52 | 122.5 | 1,180 |
| D | 85,000 | 44,600 | 1.90 | 34 | 260 |

| | Mod. (kg./cm.$^{-2}$) | | | Pressing temp. (° F.) | B.S.D. hardness |
|---|---|---|---|---|---|
| Sample | 100% | 200% | 300% | | |
| A | 8 | 13 | 17 | 300 | 45.5 |
| B | 9.3 | 12 | 15.4 | 320 | 43.5 |
| C | 14.3 | 16.8 | 19.8 | 350 | 55 |
| D | 23 | 31 | | 320 | 54 |
| E | 22 | 29 | 37 | 350 | 62.5 |

EXAMPLE II

This example illustrates the preparation of an A–B–C terpolymer, whose A block is polystyrene, the B block is a "mixed structure" isoprene and the C block is poly(ethylene sulphide), using a high vacuum technique and by modifiying the solvent for the growing of the C block.

The monomers were rigorously dried and degassed.

The required volumes of benzene, hexane and styrene were distilled under vacuum into a polymerisation reactor and a butyl lithium anisole catalyst complex (1:0.7 ratio; 3.29 mmoles) added under dry argon. The reaction mixture was heated to 40° C. and polymerisation was complete after about 3 hours, then the required volume of isoprene was added at a rate such as to keep the polymerisation controllable.

At the end of this sequence small amounts of tetrahydrofuran were added. The required volume of ethylene sulphide was then distilled into the reactor and the contents stirred well; after 20–30 minutes the contents set to a lightly-gelled mass. After 3–4 hours, the polymerisation mixture was added to acidified alcohol and the theoretical yield of polymer was obtained.

Experimental details for the preparation of styrene-isoprene-ethylene sulphide block copolymers are given

TABLE IIB

| Sample | Styrene (wt. percent) | Isoprene (wt. percent) | Ethylene sulphide (wt. percent) | Calc. segmented mol. wt. ($M_n$) | Total calc'd $M_n$ |
|---|---|---|---|---|---|
| F | 21.46 | 74.39 | 4.15 | S-11,400<br>Is-38,700<br>ES-2,350 | 52,450 |
| G | 22.8 | 76.6 | 0.6 | S-11,400<br>Is-38,700<br>ES-1,700 | 51,700 |

| | Mol. wt. (by GPC) found | | | Tensile strength (kg./cm.$^{-2}$) | Percent elong. at break |
|---|---|---|---|---|---|
| Sample | $M_w$ | $M_n$ | $M_w/M_n$ | | |
| F | 106,100 | 88,060 | 1.20 | 150 | 1,050 |
| G | 184,900 | 92,560 | 1.97 | 94.4 | 1,600 |

| | Mod. (kg./cm.$^{-2}$) | | | Pressing temp. (° F.) | B.S.D. hardness |
|---|---|---|---|---|---|
| Sample | 100% | 200% | 300% | | |
| F | 10.3 | 12.8 | 16.2 | 345 | 47.5 |
| G | 5.5 | 5.9 | 6.6 | 330 | <30 |

EXAMPLE III

This example illustrates the preparation of an A–B–C terpolymer, whose A block is polystyrene, the B block is a "mixed structure" polyisoprene and the C block is polyethylene sulphide using a laboratory reactor under an inert atmosphere.

When the polymerisation assembly was completely dry and pressure tight, the reactor [1] was charged with solvent (analar grade benzene, cyclohexane, stored under argon over No. 4A $\frac{1}{16}$ inch pellet molecular sieves), fed by displacement using argon, whilst the reactor itself was swept through continuously with pure, dried argon. Then the styrene was introduced from calibrated hypodermic syringes, and as with all additions and reactor-port openings, a stream of argon was passed through the reactor. Finally, the required amounts of anisole and n-butyl lithium were added from syringes, and the reactor was then sealed under a ca. 5 p.s.i.g. of argon. Stirring and heating commenced, the temperature being raised to 50° C. and maintained there for a minimum of three hours. After this period the contents were cooled to ca 25° C., the reactor opened and the isoprene was added from syringes. The reactor was then sealed, pressurised and heating and stirring to 50° C. resumed. During this stage a marked

---

[1] The reactor consisted of a QVF il capacity blank buttress end, clamped to a Dural top plate (secured in a framework) by means of a cast iron backing flange bolted into the top plate, and using a rubber gasket with PTFE gasket sheath to ensure an inert, pressure-tight seal. The top plate was fitted with an argon entry via a hand valve, a pressure gauge, an entry port for introducing solvent and monomers and a thermometer pocket.

exotherm occurred and careful temperature control was required. Once the exotherm had subsided the contents were heated and stirred at 50° C. for at least 3 hours, then cooled. The reactor port was then opened for introduction of the ethylene sulphide and the tetrahydrofuran, and then closed. When this C block stage was complete, the reactor was opened and the contents terminated with methanol; the block terpolymer was isolated by precipitation with a large excess of methanol containing antioxidant, and after soaking for several hours the product was removed, dried and weighed prior to testing and evaluation.

Stirring of the contents was carried out by means of a large PTFE-coated stirrer bar, actuated by a powerful magnet mounted on a geared, variable speed motor situated under the base of the blank buttress end. The blank buttress end was dried for several hours beforehand at 110° C. and cooled to room temperature in a desiccator before assembly. The gaskets and stirrer bars were stored in a desiccator between polymerisations.

The quantities of monomers, catalyst and additives charged, and the yield of terpolymer obtained are shown in Table IIIA. The terpolymer characteristics and properties are shown in Table IIIB:

TABLE IIIB—Continued

| Sample | Mod. (kg./cm.$^{-2}$) | | | Pressing temp. (° F.) | B.S.D. hardness |
|---|---|---|---|---|---|
| | 100% | 200% | 300% | | |
| H | 4.8 | 6.2 | 8.2 | 330 | <30 |
| I | 6.0 | 8.5 | 10.5 | 330 | <30 |
| J | 5.5 | 7.0 | 8.7 | 350 | ca. 30 |
| K | 9.5 | 11.0 | 14.9 | 330 | 38 |

EXAMPLE IV

This example illustrates the preparation of A–B–C terpolymers in a pilot plant reactor.

The reactor (capacity 13 liters) which was dried by first heating to 80° C. for several hours, followed by purging with nitrogen at 40° C. for 16 hours.

7.25 litres of cyclohexane were charged to the reactor at 25° C. (room temperature) followed by 325 mls. of styrene. The reaction mixture was stirred; n-butyl lithium (as a 2.35 molar solution in n-hexane) and anisole were added in the required proportions, the n-butyl lithium/anisole ratio being adjusted to 1:1. The temperature of the reaction medium was raised to 52° C., and maintained at this temperature for a minimum of three hours to form the styrene block.

After cooling to 25° C., 1500 mls. of isoprene were added, and the reaction medium was heated gradually to 52° C., when the polymerisation of the isoprene block began exothermally. The temperature was not allowed to exceed 67° C., and was returned to 52° C. within 30 minutes. The polymerisation was allowed to proceed for a further 4 hours before the temperature was reduced to 25° C.

The required volume of ethylene sulphide was added, followed by tetrahydrofuran (7.86 percent by volume on the cyclohexane charge). The temperature was raised to 32° C. and the formation of the ethylene sulphide block was allowed to proceed for 16 hours before termination with methanol. The reaction mixture was stirred until the viscosity of the medium became too great.

The polymer was then precipitated in excess methanol containing 1 percent Flectol H (antioxidant), steam-treated to remove solvent, and dried by cold milling followed by vacuum drying.

The quantities of monomers, catalyst and additives charged, and the yields of polymer obtained are shown in Table IVA; the terpolymer characteristics and properties are shown in Table IVB:

TABLE IIIA

| Sample | Solvent (ml.) | Anisole (ml.) | n-Butyl ml. sol. | Lithium, mmoles active initiator | Wt. of monomer charged, g. | | | Tetra-hydro-furan (ml.) | Yield (g.) |
|---|---|---|---|---|---|---|---|---|---|
| | | | | | Styrene | Isoprene | Ethylene sulphide | | |
| H | Benzene (300) | 0.15 | 0.90 | 1.695 | 12 | 39.4 | 2.1 | 10 | 53.5 |
| I | do | 0.075 | 0.585 | 1.10 | 12 | 39.4 | 4.0 | 20 | 55.4 |
| J | Cyclohexane (300) | 0.066 | 0.25 | 0.47 | 12 | 39.4 | 3.1 | 40 | 54.5 |
| K | Benzene (300) | 0.15 | 0.275 | 0.518 | 12 | 40.8 | 4.1 | 20 | 56.7 |

TABLE IIIB

| Sample | Styrene (wt. percent) | Isoprene (wt. percent) | Ethylene sulphide (wt. percent) | Calc. segmented mol. wt. ($M_n$) | Total calc'd $M_n$ |
|---|---|---|---|---|---|
| H | 22.7 | 77.0 | 0.30 | S-21,200 / Is-72,200 / ES-3,700 | 97,100 |
| I | 22.0 | 77.2 | 0.80 | S-23,200 / Is-79,000 / ES-7,900 | 110,100 |
| J | 21.8 | 76.5 | 1.70 | S-25,500 / Is-86,900 / ES-6,600 | 119,000 |
| K | 23.0 | 73.45 | 3.55 | S-23,200 / Is-79,000 / ES-7,900 | 110,100 |

| Sample | Mol. wt. (by GPC) found | | | Tensile strength (kg./cm.$^{-2}$) | Percent elong. at break |
|---|---|---|---|---|---|
| | $M_w$ | $M_n$ | $M_w/M_n$ | | |
| H | 623,500 | 392,500 | 1.59 | 70.7 | 1,410 |
| I | 328,020 | 198,800 | 1.63 | 124 | 1,380 |
| J | 308,240 | 235,000 | 1.31 | 126 | 1,200 |
| K | 262,520 | 193,150 | 1.73 | 145 | 1,050 |

TABLE IVA

| Sample | Solvent (litres) | Anisole (mls.) | n-Butyl lithium, ml. sol. | n-Butyl lithium, mmoles | Wt. of monomer charged, g. | | | Tetra-hydro-furan (ml.) | Yield (g.) |
|---|---|---|---|---|---|---|---|---|---|
| | | | | | Styrene | Isoprene | Ethylene sulphide | | |
| L | 7.25 | 3.10 | 12 | 28.2 | 3,000 | 1,020 | 60 | 570 | 1,260 |
| M | 7.25 | 3.10 | 12 | 28.2 | 3,000 | 1,020 | 60 | 570 | 1,238 |
| N | 7.25 | 1.00 | 13 | 30.55 | 3,000 | 1,020 | 100 | 570 | 1,520 |

TABLE IVB

| Sample | Styrene (wt. percent) | Isoprene (wt. percent) | Ethylene sulphide | Calc. segmented mol. wt. ($M_n$) | Total calc'd $M_n$ |
|---|---|---|---|---|---|
| L | 20.73 | 75.42 | 3.85 | S-10,630<br>Is-36,100<br>ES-2,210 | 48,940 |
| M | 17.38 | 78.02 | 4.60 | S-9,810<br>Is-33,300<br>ES-1,920 | 45,030 |
| N | 19.83 | 73.75 | 6.42 | S-9,810<br>Is-33,300<br>ES-1,920 | 45,030 |

| Sample | Mol. wt (by GPC) found | | | Tensile strength (kg./cm.$^{-2}$) | Percent elong. at break |
|---|---|---|---|---|---|
|  | $M_w$ | $M_n$ | $M_w/M_n$ |  |  |
| L | 106,700 | 89,440 | 1.19 | 102 | 1,000 |
| M | 100,000 | 81,130 | 1.23 | 73.5 | 840 |
| N | 137,100 | 105,800 | 1.30 | 90.4 | 800 |

| Sample | Mod. (kg./cm.$^2$) | | | Pressing Temp. (° F.) | B.S.D. Hardness |
|---|---|---|---|---|---|
|  | 100% | 200% | 300% |  |  |
| L | 12.8 | 18.4 | 23.3 | 330 | 38.5 |
| M | 10.1 | 12.9 | 17.3 | 330 | 37.5 |
| N | 11.2 | 15.0 | 20.0 | 330 | 44 |

EXAMPLE V

This example illustrates the preparation of an A–B–C terpolymer by the method used in Example II using alternative monomers.

Experimental details for the preparation of the A–B–C terpolymer are given in Table VA and the characteristics and properties in Table VB:

TABLE VB

| Sample | Block A (wt. percent) | Block B (wt. percent) | Block C (wt. percent) |
|---|---|---|---|
| O | 2,5-di-Me-styrene (23.71). | Isoprene (75.61) | Ethylene sulphide (0.68). |
| Q | Alpha-methyl-styrene (23.71). | Isoprene (75.67) | Ethylene sulphide (0.62). |
| R | Styrene (23.85) | Isoprene (71.12) | Ethylene sulphide (5.03). |
| S | Styrene (46.5) | Isoprene (43.25) | Ethylene sulphide (10.25). |

| Sample | Calc'd segmental Mol. wt. ($M_n$) | Total calc'd Mol. wt. ($M_n$) | Mol. wt. (by GPC) | | |
|---|---|---|---|---|---|
|  |  |  | $M_w$ | $M_n$ | $M_w/M_n$ |
| O | 8,500<br>29,000<br>1,700 | 39,200 | 255,000 | 45,600 | 5.6 |
| Q | 16,900<br>56,000<br>3,300 | 76,200 | 324,200 | 248,200 | 1.31 |
| R | 17,000<br>58,000<br>3,500 | 78,500 | 324,000 | 150,000 | 2.16 |
| S | 17,000<br>58,000<br>3,500 | 78,500 | 75,200 | 36,200 | 2.08 |

| Sample | Ten. stgth., kg./cm.$^{-2}$ | Percent elong. at break | Mod. kg./cm.$^{-2}$ | | | Pressing temp. (° F.) |
|---|---|---|---|---|---|---|
|  |  |  | 100% | 200% | 300% |  |
| O | 42.5 | 2,400 | 4.4 | 4.5 | 5.0 | 330 |
| Q | 126 | 380 | 58.6 | 80.0 | 107 | 325 |
| R | 134 | 380 | 61.7 | 90.5 | 119.5 | 320 |
| S | 95 | ca. 110 | 110 |  |  | 330 |

EXAMPLE VI

This example illustrates the preparation of an A–B–C terpolymer by the method of Example III, using alternative monomers.

TABLE VA

| Sample | Solvent (mls.) | Anisole | n-Butyl lithium mmoles | A-Block monomer (g.) | B-Block monomer (g.) | C-Block monomer (g.) | Tetrahydrofuran (mls.) added | Yield (g.) |
|---|---|---|---|---|---|---|---|---|
| O | Benzene/hexane (250) | 0.20 | 1.41 | 2,5-di-Me-styrene (13.5) | Isoprene (40.8) | Ethylene sulphide (2.5) | 23 | 52.7 |
| Q | (¹) | 0 | 1.395 | Alpha-Me-styrene (23.6) | Isoprene (78.2) | Ethylene sulphide (4.6) | 150 | 101.6 |
| R | THF 250 | 0 | 1.41 | Styrene (24) | Isoprene (81.6) | Ethylene sulphide (5.0) | 0 | 100.6 |
| S | THF 250 | 0 | 0.70 | Styrene (12) | Isoprene (40.8) | Ethylene sulphide (2.5) | 0 | 24.2 |

¹ Alpha-methyl-styrene polymerised in 75 ml. tetrahydrofuran at −68° C., 5.5 hrs. later 3 ml. isoprene added, left at −70°C. overnight, then all tetrahydrofuran removed and replaced with 250 ml. benzene/hexane mixture in which the remainder of the isoprene was polymerised at ca. 50° C., left at room temperature for 12 hours then 150 ml. tetrahydrofuran distilled into reactor and C-Block stage completed after ethylene sulphide addition after 12 hours.

Experimental details are given in Table VIA and characteristics and properties in Table VIB:

TABLE VIA

| Sample | Solvent (mls.) | Anisole (mls.) | N-Butyl lithium, mmoles | A-Block monomer (g.) | B-Block monomer (g.) | C-Block monomer (g.) | Tetrahydrofuran (mls.) added | Yield (g.) |
|---|---|---|---|---|---|---|---|---|
| P | Toluene (300) | 0.15 | 0.7 | 4-vinyl toluene (12.3) | Isoprene (40.8) | Ethylene sulphide (4.1.) | 10 | 56.0 |
| T | do | 0.20 | 0.525 | Styrene (12) | Isoprene/styrene (31/13.4) | do | 7.5 | 53.6 |
| U | Benzene (300) | 0.20 | 1.51 | do | Isoprene/styrene (50/10) | do | 5.0 | 5.93 |
| V | do | ¹ 0.375 | 1.175 | do | Isoprene/styrene (35.4/12.9) | do | 5.0 | 63.2 |

¹ Added in two portions, 0.125 mls. at beginning of A-Block and 0.25 mls. at beginning of B-Block.

TABLE VIB

| Sample | Block A (wt. percent) | Block B (wt. percent) | Block C (wt. percent) |
|---|---|---|---|
| P | 4-vinyl toluene (24.13) | Isoprene (77.46) | Ethylene sulphide (1.41) |
| T | Styrene (24.14) | Isoprene/styrene 75.63 (70/30) | Ethylene sulphide (0.23) |
| U | Styrene (25.64) | Isoprene/styrene 73.08 (88.3/16.7) | Ethylene sulphide (1.28) |
| V | Styrene (21.51) | Isoprene/styrene 77.08 (63.3/26.7) | Ethylene sulphide (1.41) |

| Sample | Calc'd segmental mol. wt. ($M_n$) | Total calc'd mol. wt. ($M_n$) | Mol. wt. (by GPC) | | |
|---|---|---|---|---|---|
| | | | $M_w$ | $M_n$ | $M_w/M_n$ |
| P | 7,300 / 24,700 / 2,400 | 34,400 | 150,100 | 113,900 | 1.32 |
| T | 22,900 / 84,500 / 7,800 | 115,200 | 213,200 | 152,800 | 1.4 |
| U | 7,900 / 39,600 / 2,700 | 50,200 | 119,000 | 56,500 | 2.1 |
| V | 10,200 / 41,000 / 3,500 | 54,700 | 109,000 | 56,100 | 1.9 |

| Sample | Tens. stgth, kg./cm.$^{-2}$ | Percent elong. at brk. | Mod. kg./cm.$^{-2}$ | | | Pressing temp. (° F.) |
|---|---|---|---|---|---|---|
| | | | 100% | 200% | 300% | |
| P | 23.6 | 700 | 4.6 | 6.1 | 8.0 | 330 |
| T | 55.9 | 1,150 | 12.1 | 13.2 | 15.6 | 325 |
| U | 64.6 | 760 | 17.5 | 24.4 | 32.7 | 330 |
| V | 48.4 | 900 | 12.4 | 13.1 | 16.0 | 330 |

Having now described our invention, what we claim is:

1. A block copolymer having a configuration A–B–C in which
   A represents a block of a relatively rigid homopolymer having an average molecular weight in the range of 5,000 to 50,000 and formed from a monomer selected from the group consisting of styrene, 2,5-dimethyl styrene, 4-vinyl toluene, alpha-methyl styrene and vinyl naphthalene,
   B represents an elastomeric block having an average molecular weight in the range of 20,000 to 400,000 and selected from the group consisting of polybutadiene, polyisoprene, butadiene-styrene copolymers and isoprene-styrene copolymers and
   C represents a crystalline polyethylene sulfide block having a molecular weight of 300 to 20,000, wherein A comprises 2 to 60% by weight of the block copolymer, B comprises 10 to 95% by weight of the block copolymer, and C represents 0.1 to 30% by weight of the block copolymer.

2. A block copolymer according to claim 1 in which A has an average molecular weight in the range 5,000 to 30,000.

3. A block copolymer according to claim 1 in which A constitutes from 4 to 60 percent by weight of the block copolymer.

4. A block copolymer according to claim 1 in which A has a second-order transition temperature higher than 50° C.

5. A block copolymer according to claim 1 in which A is derived from styrene.

6. A block copolymer according to claim 1 in which B has an average molecular weight in the range 20,000 to 100,000.

7. A block copolymer according to claim 1 in which B has a second-order transition temperature below 15° C.

8. A block copolymer according to claim 1 in which B is derived from isoprene or butadiene.

9. A block copolymer according to claim 1 in which C has a molecular weight of 1,000 to 10,000.

10. A block copolymer according to claim 1 in which C constitutes from 1 to 30 percent by weight of the block copolymer.

11. A block copolymer according to claim 1 in which the melting point of C is greater than 50° C.

References Cited
UNITED STATES PATENTS

| | | | |
|---|---|---|---|
| 3,050,511 | 8/1962 | Szwarc | 260—93.5 |
| 3,175,997 | 3/1965 | Hsieh | 260—880 |
| 3,225,120 | 12/1965 | Baker | 260—94.2 |
| 3,225,121 | 12/1965 | Baker | 260—94.2 |
| 3,458,600 | 7/1969 | Mann | 260—879 |
| 3,459,700 | 8/1969 | Richards | 260—880 |

JAMES A. SEIDLECK, Primary Examiner

U.S. Cl. X.R.

260—880